US009210368B2

(12) United States Patent
Stone

(10) Patent No.: US 9,210,368 B2
(45) Date of Patent: Dec. 8, 2015

(54) DIGITAL VIDEO RECORDER FOR AUTOMATICALLY RECORDING AN UPCOMING PROGRAM THAT IS BEING ADVERTISED

(75) Inventor: Christopher J. Stone, Newtown, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 96 days.

(21) Appl. No.: 11/024,043

(22) Filed: Dec. 28, 2004

(65) Prior Publication Data

US 2006/0143658 A1    Jun. 29, 2006

(51) Int. Cl.
| H04N 9/80 | (2006.01) |
| H04N 5/782 | (2006.01) |
| H04N 7/173 | (2011.01) |
| H04N 21/442 | (2011.01) |
| H04N 21/472 | (2011.01) |
| H04N 21/81 | (2011.01) |
| H04N 21/8405 | (2011.01) |

(52) U.S. Cl.
CPC ........... *H04N 5/782* (2013.01); *H04N 7/17318* (2013.01); *H04N 21/44218* (2013.01); *H04N 21/47214* (2013.01); *H04N 21/812* (2013.01); *H04N 21/8405* (2013.01)

(58) Field of Classification Search
CPC .............. H04N 5/782; H04N 7/17318; H04N 21/44218; H04N 21/47214; H04N 21/812; H04N 21/8405

USPC .......... 386/1, 34, 46, 83, 95, 125; 725/22, 39, 725/61, 58, 42, 136
See application file for complete search history.

(56) References Cited

U.S. PATENT DOCUMENTS

| 5,870,523 | A  | * | 2/1999 | Kikuchi et al. ................. 386/95 |
| 6,373,526 | B1 |   | 4/2002 | Kessler et al. ................ 348/468 |
| 6,388,714 | B1 | * | 5/2002 | Schein et al. ................. 348/563 |
| 6,553,180 | B1 | * | 4/2003 | Kikuchi et al. ............... 386/241 |
| 6,751,398 | B2 |   | 6/2004 | Agnihotri et al. .............. 386/46 |
| 6,799,199 | B1 |   | 9/2004 | Segal et al. .................. 709/207 |
| 6,868,225 | B1 | * | 3/2005 | Brown et al. ................... 386/83 |
| 6,973,256 | B1 | * | 12/2005 | Dagtas .......................... 386/241 |
| 7,159,232 | B1 | * | 1/2007 | Blackketter et al. ........... 725/38 |
| 2002/0009285 | A1 | * | 1/2002 | Safadi et al. .................... 386/46 |

* cited by examiner

*Primary Examiner* — Tat Chio
(74) *Attorney, Agent, or Firm* — Fish & Richardson P.C.

(57) ABSTRACT

A method and apparatus is provided for recording a program being advertised during a broadcast of another program. The method begins by receiving a user request to record the program being advertised in an advertisement appearing in a broadcast of the other program. The other program is embodied in a video signal received from an external broadcasting source. At least one prescribed keyword is identified in a locally stored segment of the video signal that contains the advertisement. The prescribed keyword(s) pertains to a time at which the program being advertised is to be broadcast. A recording session is established in accordance with the prescribed keyword(s) to record the program being advertised. Finally, the program being advertised is recorded during the established recording session.

19 Claims, 2 Drawing Sheets

DIGITAL VIDEO RECORDER FOR AUTOMATICALLY RECORDING AN UPCOMING PROGRAM THAT IS BEING ADVERTISED

FIELD OF THE INVENTION

The invention relates generally to digital video recorder systems, and more particularly to a digital video recording system that automatically records an upcoming program that is being advertised during another program.

BACKGROUND OF THE INVENTION

Digital video recorder (DVR) systems are becoming increasingly popular with consumers. Digital video recorder systems use magnetic hard disk drives rather than magnetic cassette tapes to store video programs received from coaxial cable, a satellite dish, an antenna for terrestrial radio frequency signals, or a modem that permits access to content from the Internet. For example, the ReplayTV™ recorder and the TiVO™ recorder record television programs in digital formats on hard disk drives using, for example, MPEG-2 compression. Also, some DVR systems may record on a readable/writable digital versatile disk (DVD) rather than a magnetic disk. Users may schedule programs to be recorded and may play back the recorded programs at a later time. These systems also record what users are watching in real-time, allowing users to pause real-time programs when, for example, the user must leave the room. The systems may continue recording and storing the program being broadcast while the displayed program is paused. Users may resume their viewing where they left off, and may fast forward through commercials until they reach the point at which the program is currently being provided.

DVR systems can record a broadcast when the user establishes a start and stop recording time. Alternatively, the DVR system may rely on an electronic program guide (EPG), which is an interactive, on-screen display feature that displays information analogous to TV listings found in local newspapers or other print media. An EPG provides information about each program being broadcast within the time period covered by the EPG, which typically ranges from the next hour up to several days. The information contained in an EPG includes programming characteristics such as, for example, channel number, program title, start time, end time, elapsed time, time remaining, and a brief description of the program's content. Unlike non-interactive guides that reside on a dedicated channel and merely scroll through the current programming on the other channels for the next few hours, EPGs allow viewers to select any channel at any time during some period into the future, e.g., up to several days forward. The EPG allows the viewer to automatically record a program based on the information in the EPG.

Currently, TiVO™ recorders offer another way to record programs, in particular programs that are advertised during the course of other programming. This technique employs metadata that is incorporated into the advertisement, which can be recognized by the Tivo recorder. If the viewer so desires, the TiVO™ recorder can be instructed through its user interface to automatically record the advertised program. Unfortunately, if a viewer is watching an advertisement about an upcoming program that does not incorporate such metadata, or if the viewer is equipped with a DRV system that is not compliant with this feature of TiVO™ recorders, the viewer will have to go through a more complex procedure (e.g., using the EPG) to establish a recording session to record the advertised program.

Accordingly, it would be desirable to provide a method and apparatus for a digital video recorder system that has the ability to automatically establish a recording session for an upcoming program that is advertised on another program that the viewer is watching without the need for metadata in the advertisement.

SUMMARY OF THE INVENTION

In accordance with the present invention, a method and apparatus is provided for recording a program being advertised during a broadcast of another program. The method begins by receiving a user request to record the program being advertised in an advertisement appearing in a broadcast of the other program. The other program is embodied in a video signal received from an external broadcasting source. At least one prescribed keyword is identified in a locally stored segment of the video signal that contains the advertisement. The prescribed keyword(s) pertains to a time at which the program being advertised is to be broadcast. A recording session is established in accordance with the prescribed keyword(s) to record the program being advertised. Finally, the program being advertised is recorded during the established recording session.

In accordance with one aspect of the invention, the step of identifying at least one prescribed keyword comprises extracting the prescribed keyword(s) from a closed caption portion of the locally stored segment of the video signal.

In accordance with another aspect of the invention, the step of identifying at least one prescribed keyword comprises extracting the prescribed keyword(s) from an audio portion of the locally stored segment of the video signal.

In accordance with another aspect of the invention, the step of identifying at least one prescribed keyword comprises extracting the prescribed keyword(s) from an image portion of the locally stored segment of the video signal.

In accordance with another aspect of the invention, the step of identifying at least one prescribed keyword comprises attempting to extract the prescribed keyword(s) from a closed caption portion of the locally stored segment of the video signal. If the prescribed keyword(s) is not available from the closed caption portion, the method continues by extracting the prescribed keyword(s) from an audio portion of the locally stored segment of the video signal.

In accordance with another aspect of the invention, the step of identifying at least one prescribed keyword comprises attempting to extract the prescribed keyword(s) from a closed caption portion of the locally stored segment of the video signal. If the prescribed keyword(s) is not available from the closed caption portion, the method continues by attempting to extract the prescribed keyword(s) from an audio portion of the locally stored segment of the video signal. If the prescribed keyword(s) is not available from the audio portion, the method continues by extracting the prescribed keyword(s) from an image portion of the locally stored segment of the video signal.

In accordance with another aspect of the invention, prescribed keywords include a day of week and time of day at which the program being advertised is to broadcast.

In accordance with another aspect of the invention, the prescribed keywords include a date and time of day at which the program being advertised is to broadcast.

In accordance with another aspect of the invention, the prescribed keywords include a month, day of week and time of day at which the program being advertised is to broadcast.

In accordance with another aspect of the invention, the user is requested to verify establishment of the recording session.

In accordance with another aspect of the invention, a computer-readable storage medium is provided. The storage medium has stored thereon one or more software programs which, when executed, implement the aforementioned method.

In accordance with another aspect of the invention, the video signal is encoded according to a moving pictures experts group (MPEG) standard.

In accordance with another aspect of the invention, the program being advertised is recorded on a hard disk drive.

In accordance with another aspect of the invention, the program being advertised is recorded on an optical storage medium.

In accordance with another aspect of the invention, the locally stored segment of the video signal that contains the advertisement is stored in a buffer.

In accordance with another aspect of the invention, an apparatus is provided for recording a program being advertised during a broadcast of another program. The apparatus includes a computer-readable storage medium, a processor responsive to the computer-readable storage medium and to a software program. The software program, when loaded into the processor, is operative to receive a user request to record the program being advertised in an advertisement appearing in a broadcast of the other program. The other program is embodied in a video signal received from an external broadcasting source. The software program is also operative to identify at least one prescribed keyword in a locally stored segment of the video signal that contains the advertisement. The keyword(s) pertains to a time at which the program being advertised is to be broadcast; The software program is further operative to cause a recording session to be established in accordance with the prescribed keyword(s) and to cause the program being advertised to be recorded onto the computer-readable storage medium during the established recording session.

DETAILED DESCRIPTION

The present invention allows a digital video recorder (DVR) system to automatically establish a recording session for an upcoming program that is advertised on another program that the viewer is watching without the need for metadata in the advertisement.

Figure 1:
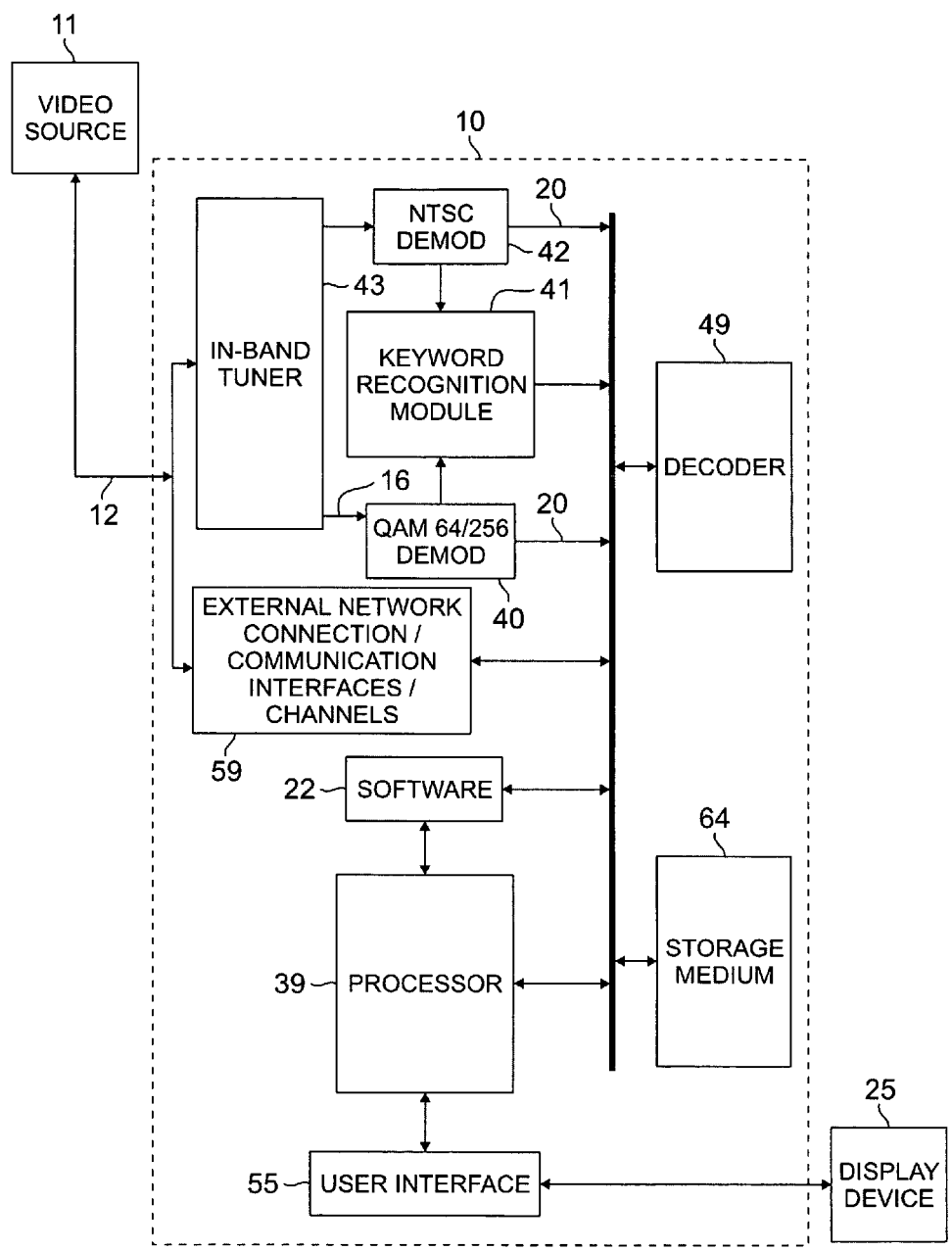
FIG. 1 depicts the main components of a DVR system constructed in accordance with the principles of the present invention.

Turning now to the drawings, where like numerals designate like components, FIG. 1 is a block diagram of a DVR system 10 ("system 10"). System 10 receives video signal 12 from video source 11. As shown, system 10 is a cable set-top box, video source 11 is a hybrid fiber-optic/coax cable network operated by a cable television operator, and video signal 12 is a multi-channel analog and/or digital programming source broadcast by the cable operator. System 10, however, may be any device or combination of devices capable of receiving, recording and playing back video signal 12; video source 11 may be any public or private, wired or wireless, video transmission infrastructure or technology, including but not limited to a fiber-optic network, a coaxial cable network, a hybrid network, a satellite network, cellular network, the Internet, a television network, a radio network, a copper wire network, or any other existing or future transmission infrastructure or technology, operated by any type of program provider, such as a television network or station, a studio, an Internet broadcaster or service provider, a cable operator, or a satellite operator; and video signal 12 may be any pre-recorded or live analog or digital electronic signal representing an image and/or audio, in any format.

DVR system 10 includes external network connection/communication interfaces 59, which support devices such as modems, streaming media players and other network connection support devices and/or software, coupled through local or wide area networks (not shown) to program providers and providers of other content, such as advertising content.

DVR system 10 further includes an in-band tuner 43, which tunes to a channel signal 16 selected by a consumer (not shown) via user interface 55. User interface 55 may be any type of known or future device or technology allowing the consumer to select channels or programs the consumer wishes to receive, but is preferably a remote control, mouse, microphone, keyboard, or display associated with a personal video recorder.

Channel signal 16 includes video and/or audio components Demodulators 40 and 42 are responsive to in-band tuner 43. Demodulator 40, which may be a 64/256 quadrature amplitude modulation demodulator, is responsive to receive a digital version of channel signal 16. Demodulator 40 identifies digital data packets from one or more digital sources, such as a Moving Pictures Experts' Group (MPEG) transport stream, a high-definition television stream, or a media stream from an external network connection 59, such as a cable modem, using well-known methods and techniques. Demodulator 42, which may be an NTSC demodulator, for example, is responsive to receive an analog version of channel signal 16 and to decode signals and markers according to well-known methods and techniques. Demodulators 40 and 42 are operative to output video information 20.

Video information 20 includes raw video or audio data, arranged for formatting in accordance with a predetermined media format. Video information 20 is preferably arranged in accordance with an MPEG media format, such as an MPEG-2 media format, but may be arranged in accordance with other media formats, including but not limited to other MPEG formats, Hypertext Markup Language (HTML), Virtual Hypertext Markup Language (VHTML), X markup language (XML), H.261, or H.263 formats.

Storage medium 64 is responsive to receive, among other things, encoded video signal 20 for storage. Storage medium 64 may be any local or remote device, now known or later developed, capable of recording data, including but not limited to a hard disk drive, a videocassette recorder tape, all types of optical storage media such as compact disks and digital videodisks, a magnetic tape, a home router, or a server.

Decoder 49 is responsive to receive recorded encoded video signal 20 from storage medium 64, and to play back recorded encoded video signal 20 via display device 25, in response to instructions from user interface 55. Decoder 49 is also responsive to receive and pass through video programming directly from tuner 43. Internal arrangements of decoder 49 are well known—decoder 49 may include analog-to-digital converters, one or more storage media and/or buffers, and general or special-purpose processors or application-specific integrated circuits, along with demultiplexors for demultiplexing and/or synchronizing at least two transport streams, for example, video and audio. Video and audio decoders and/or analog and digital decoders may be separate, with communication between separate decoders allowing for synchronization, error correction and control.

Display device 25, which also includes speakers for outputting audio signals, displays video programming received from tuner 43 or storage medium 64. Display device 25 is responsive to receive analog or digital signals, including but not limited to S-video, composite audio-video, SPDIF, and DVI.

In accordance with an aspect of the present invention, keyword recognition module 41 is operative to extract predetermined keywords from the video signal 20. The keywords that are to be identified are those necessary to establish a recording session and include, for instance, the program title and the month, day of week, date, and time of day at which the selected program is to be broadcast. The keywords may be extracted from the audio, video, and/or closed-captioned portion (if available) of the video signal. If the audio portion of the video steam is employed, keyword recognition module 41 may incorporate voice recognition technology to parse, stem and identify spoken words to extract the prescribed keywords. If the image or video portion of the video stream is employed, keyword recognition module 41 may employ any available image recognition hardware and/or software. If the closed caption portion of the video stream is employed, keyword recognition module 41 may incorporate a conventional closed captioned decoder. The closed caption text can be incorporated into analog and digital versions of channel signal 16 using well-known standards such as EIA-608 for analog signals and EIA-708 for digital signals, for example.

Processor 39 and software 22 are illustrated functionally, and are responsive to various elements of system 10, including demodulators 40 and 42, keyword recognition module 41, storage medium 64 and decoder 49. When loaded into a processor, such as processor 39, software 22 is operative to control encoding, recording and playback of encoded video signal 20. It will be appreciated, however, that aspects of the present invention are not limited to any specific embodiments of computer software or signal processing methods. For example, one or more processors packaged together or with other elements of system 10 may implement functions of processor 39 in a variety of ways. It will also be appreciated that software 22 may be any stored instructions, in one or more parts (stored, for example, on storage medium 64, or another internal or external storage medium such as a read-only-memory or a random-access memory) electronically controlling functions provided by system 10, including firmware, and may be used or implemented by one or more elements, including one or more processors, of system 10.

During normal operation of system 10 in accordance with aspects of the present invention, a consumer using user interface 55 selects a particular program to be recorded from video source 11 and/or selects a recorded program for playback from storage medium 64. When a program is to be recorded, an encoded video signal 20 associated with the selected program is transferred to storage medium 64. Likewise, when a program is to be played back, an encoded video signal 20 associated with the selected program is transferred from storage medium 64 to decoder 49 for processing. Decoder 49 demultiplexes and decodes encoded video signal 20 for presentation to the consumer via display device 25.

Figure 2:
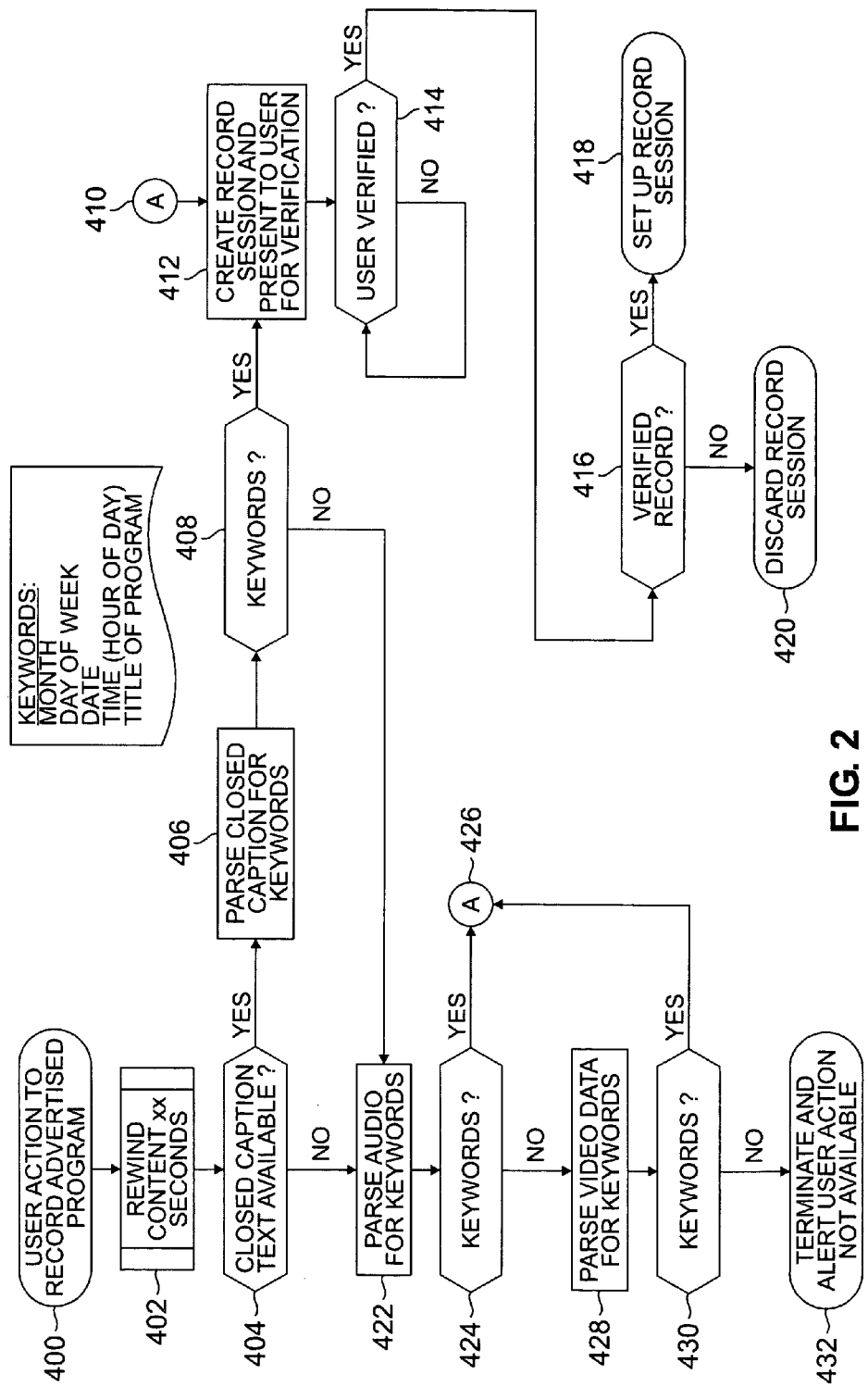
FIG. 2 is flow diagram of a method for recording an advertised program in accordance with one embodiment of the present invention.

FIG. 2 is flowchart of a method which may be implemented by DVR system 10 for establishing a recording session for an advertised program. The method begins in step 400 when the viewer, watching a program on display device 25 received from video source 11, observes an advertisement for another program that he or she would like to record. In this case the viewer initiates the recording process via user interface 55. In response, the DVR system 10 in step 402 begins an analysis of the immediately preceding segment of the video signal associated with the program that the viewer is watching. The preceding segment, which may have a fixed duration (e.g., 1 minute) sufficient to encompass the entire advertisement, may be stored in a buffer located in the DVR system 10. The buffer may be associated, for example, with the demodulators 40 and 42 and/or the keyword recognition module 41.

In step 404 the keyword recognition module 41 determines whether closed caption text is available in the buffered segment of the video signal 20 that contains the advertisement. If so, the method continues in step 406, in which the keyword recognition module 41 parses the closed caption text to extract and identify any of the prescribed keywords that may be present. If one or more such keywords are identified, the processor 39 in step 412 establishes a recording session in accordance with the identified keyword(s) and presents the proposed recording session to the viewer for verification. If the viewer verifies in step 414 that the correct program is to be recorded, the creation of the recording session is confirmed in step 418. If the viewer determines that the program is not to be recorded, the processor 39 in step 420 deletes the recording session.

Returning to step 404, if the keyword recognition module 41 determines that closed caption text is not available (or if in step 408 module 41 determines that none of the prescribed keywords are present in the closed caption text), the audio portion of the buffered segment of the video signal 20 is analyzed in step 422 by keyword recognition module 41 to extract and identify any of the prescribed keywords that may be present. If one or more such keywords are identified, the process continues in step 424 by returning to step 412 to establish a recording session in the aforementioned manner.

If in step 424 module 41 determines that audio-based keywords are not available, the video portion of the buffered segment of the video signal 20 is analyzed in step 428 by keyword recognition module 41 to extract and identify any of the prescribed keywords that may be present. If one or more such keywords are identified, the process continues in step 430 by returning to step 412 to establish a recording session in the aforementioned manner. Alternatively, if none of the prescribed keywords are available from the video portion of the signal 20, the process terminates in step 432 by notifying the viewer that a recording session is unavailable.

The embodiment of the invention set forth in the flowchart of FIG. 2 sequentially examines closed-captioned text, audio, and finally video to extract and identify one or more of the prescribed keywords. This sequence may be advantageously employed because it proceeds from the component of the video signal 20 easiest to analyze (closed caption text) to the most difficult (the image or video component). However, the present invention encompasses other sequences in which the components are analyzed. In addition, the present invention encompasses the analysis of two (or even all three) of the components of the video signal even if one or more of the prescribed keywords have already been extracted and identified.

The method illustrated in the flowchart of FIG. 2 may be implemented by any stored instructions, such as software 22. When loaded into a processor, such as processor 39, software 22 would operate to control analysis of the video signal 20 and the establishment of a recording session. As indicated above, however, it will be appreciated that aspects of the present invention are not limited to any specific embodiments of computer software or signal processing methods.

Although a specific architecture has been described herein, including specific functional elements and relationships, it is contemplated that the systems and methods herein may be implemented in a variety of ways. For example, functional elements may be packaged together or individually, or may be implemented by fewer, more or different devices, and may be either integrated within other products, or adapted to work with other products externally. When one element is indicated as being responsive to another element, the elements may be directly or indirectly coupled.

It will furthermore be apparent that other and further forms of the invention, and embodiments other than the specific embodiments described above, may be devised without departing from the spirit and scope of the appended claims and their equivalents, and it is therefore intended that the scope of this invention will only be governed by the following claims and their equivalents.

The invention claimed is:

1. A method for recording an advertised program that is advertised during a broadcast of a first program different from the advertised program, the method comprising:
   receiving, during the broadcast of the first to a user, a request from the user to record a future broadcast of the advertised program, wherein the advertised program is advertised in an advertisement appearing in the broadcast of the first program, the first program being embodied in video data received from an external broadcasting source;
   in response to receiving the request from the user, locally storing a video segment of the first program that was broadcast to the user, the video segment including a preceding segment broadcast to the user immediately prior to receiving the request and the video segment having a predefined duration that is less than a duration of the first program;
   parsing the locally stored video segment to extract and identify at least one prescribed keyword;
   determining, based on the at least one prescribed word, the future broadcast of the advertised program to record;
   automatically establishing a recording session to record the future broadcast of the advertised program; and
   recording the advertised program during the established recording session.

2. The method of claim 1, wherein parsing the locally stored video segment to extract and identify at least one prescribed keyword comprises extracting the at least one prescribed keyword from a closed caption portion of the locally stored video segment.

3. The method of claim 1, wherein parsing the locally stored video segment to extract and identify at least one prescribed keyword comprises extracting the at least one prescribed keyword from an image portion of the locally stored video segment.

4. The method of claim 1, wherein parsing the locally stored video segment to extract and identify at least one prescribed keyword comprises:
   attempting to extract the at least one prescribed keyword from a closed caption portion of the locally stored video segment; and
   in response to the at least one prescribed keyword not being available from the closed caption portion, extracting the at least one prescribed keyword from an audio data portion of the locally stored video segment.

5. The method of claim 1, wherein parsing the locally stored video segment to extract and identify at least one prescribed keyword comprises:
   attempting to extract the at least one prescribed keyword from a closed caption portion of the locally stored video segment; and
   if the at least one prescribed keyword is not available from the closed caption portion, attempting to extract the at least one prescribed keyword from an audio data portion of the locally stored video segment; and
   if the at least one prescribed keyword is not available from the audio data portion, extracting the at least one prescribed keyword from an image portion of the locally stored video segment.

6. The method of claim 1, wherein the at least one prescribed keyword comprises a date and time of day at which the advertised program is to be broadcast.

7. The method of claim 1, further comprising:
   requesting the user to verify establishment of the recording session.

8. A non-transitory computer-readable storage medium having stored thereon one or more software programs which, when executed, implement the method of claim 1.

9. The method according to claim 1, wherein the video data is encoded according to a moving pictures experts group (MPEG) standard.

10. The method of claim 1, wherein the advertised program is recorded on a hard disk drive.

11. The method of claim 1, wherein the advertised program is recorded on an optical storage medium.

12. The method of claim 1, wherein the locally stored video segment that contains the advertisement is stored in a buffer.

13. An apparatus for recording an advertised program that is advertised during a broadcast of a first program different from the advertised program, the apparatus comprising:
    a non-transitory computer-readable storage medium; and
    a processor responsive to the computer-readable storage medium and to a software program, the software program, when loaded into the processor, operative to:
       receive, during the broadcast of the first program to a user, a request from the user to record a future broadcast of the advertised program, wherein advertised program is advertised in an advertisement appearing in the broadcast of the first program, the first program being embodied in video data received from an external broadcasting source;
       in response to receiving the request from the user, locally store a video segment of the first program that was broadcast to the user, the video segment including a preceding segment broadcast to the user immediately prior to receiving the request and the video segment having a predefined duration that is less than a duration of the first program;
       parse the locally stored video segment to extract and identify at least one prescribed keyword;
       determine, based on the at least one prescribed word, the future broadcast of the advertised program to record;
       cause a recording session to be established to record the future broadcast of the advertised program; and
       cause the advertised program to be recorded onto the computer-readable storage medium during the established recording session.

14. The apparatus of claim 13, wherein parsing the locally stored video segment to extract and identify at least one prescribed keyword comprises extracting the at least one prescribed keyword from a closed caption portion of the locally stored video segment.

15. The apparatus of claim 13, wherein parsing the locally stored video segment to extract and identify at least one prescribed keyword comprises:
- attempting to extract the at least one prescribed keyword from a closed caption portion of the locally stored video segment; and
- in response to the at least one prescribed keyword not being available from the closed caption portion, extracting the at least one prescribed keyword from an audio data portion of the locally stored video segment.

16. The apparatus of claim 13, wherein parsing the locally stored video segment to extract and identify at least one prescribed keyword comprises:
- attempting to extract the at least one prescribed keyword from a closed caption portion of the locally stored video segment; and
- if the at least one prescribed keyword is not available from the closed caption portion, attempting to extract the at least one prescribed keyword from an audio data portion of the locally stored video segment; and
- if the at least one prescribed keyword is not available from the audio data portion, extracting the at least one prescribed keyword from an image portion of the locally stored video segment.

17. An apparatus for recording an advertised program that is advertised during a broadcast of a first program different from the advertised program, the apparatus comprising:
- a non-transitory computer-readable storage medium; and
- a processor responsive to the computer-readable storage medium and to a software program, the software program, when loaded into the processor, operative to:
  - receive, during the broadcast of the first program to a user, a request from the user to record a future broadcast of the advertised program, wherein the advertised program is advertised in an advertisement appearing in the broadcast of the first program, said first program being embodied in video data received from an external broadcasting source;
  - in response to receiving the request from the user, locally store a video segment of the first program that was broadcast to the user, the video segment including a preceding segment broadcast to the user immediately prior to receiving the request and the video segment having a predefined duration that is less than a duration of the first program;
  - parse the locally stored video segment to extract and identify at least one prescribed keyword;
  - determine, based on the at least one prescribed word, the future broadcast of the advertised program to record;
  - cause a recording session to be established to record the advertised program; and
  - cause the advertised program to be recorded onto the computer-readable storage medium during the established recording session.

18. The method of claim 1, wherein the prescribed keyword identifies a time at which the advertised program is scheduled to be broadcast.

19. The method of claim 1, further comprising:
- in response to receiving the request from the user and in response to determining that the future broadcast of the advertised program to record, presenting data (i) identifying the future broadcast of the advertised program to the user and (ii) requesting verification of the advertised program; and
- receiving, from the user, verification of the advertised program,
- wherein the recording session is established in response to receiving the verification.

* * * * *